(12) United States Patent
Takahashi et al.

(10) Patent No.: US 7,959,171 B2
(45) Date of Patent: Jun. 14, 2011

(54) LOWER SPRING SEAT MOUNTING STRUCTURE FOR VEHICLE SUSPENSION

(75) Inventors: Kazuomi Takahashi, Atsugi (JP); Yunosuke Yamada, Machida (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 29 days.

(21) Appl. No.: 12/264,644

(22) Filed: Nov. 4, 2008

(65) Prior Publication Data
US 2009/0134596 A1    May 28, 2009

(30) Foreign Application Priority Data

Nov. 26, 2007  (JP) ................................. 2007-304683
Jul. 28, 2008  (JP) ................................. 2008-193454

(51) Int. Cl.
*B60G 11/16* (2006.01)
*B60G 3/06* (2006.01)
*F16F 1/12* (2006.01)

(52) U.S. Cl. ... 280/124.151; 280/124.179; 280/124.141; 267/179; 267/33

(58) Field of Classification Search ........... 280/124.179, 280/124.141, 124.142, 685, 124.151, FOR. 117, 280/FOR. 118, FOR. 119, FOR. 121, FOR. 153, 280/FOR. 158, FOR. 179, FOR. 181; 267/170, 267/178, 248, 253, 254, 286, 190, 202, 209, 267/216, 221, 240, 28, 33, 34, 225, 220, 179, 166; 188/321.11; 180/9.56

See application file for complete search history.

(56) References Cited

U.S. PATENT DOCUMENTS

| | | | |
|---|---|---|---|
| 5,544,725 A * | 8/1996 | Handke et al. ............. | 267/221 |
| 6,149,171 A * | 11/2000 | Bono et al. ............. | 280/124.179 |
| 6,254,072 B1 * | 7/2001 | Bono et al. .................. | 267/220 |
| 6,257,605 B1 * | 7/2001 | Zernickel et al. ...... | 280/124.147 |
| 6,382,648 B1 * | 5/2002 | Handke ................... | 280/124.151 |
| 6,749,047 B2 * | 6/2004 | Koyano et al. ........... | 188/321.11 |
| 7,631,882 B2 * | 12/2009 | Hirao et al. .............. | 280/6.157 |
| 2006/0175788 A1 * | 8/2006 | Nuno et al. ............. | 280/124.153 |

FOREIGN PATENT DOCUMENTS

JP              4-49396 Y2    11/1992

* cited by examiner

Primary Examiner — Ruth Ilan
Assistant Examiner — Keith Frisby
(74) Attorney, Agent, or Firm — Foley & Lardner LLP

(57) ABSTRACT

A lower spring seat mounting structure in a suspension of a vehicle, including a spring mounting portion to which a lower end portion of a coil spring is mounted, the spring mounting portion being disposed on a lower link, an elastic lower spring seat including one side surface that is in contact with the spring mounting portion and the other side surface that is in contact with the lower end portion of the coil spring, and a seat mounting portion at which the lower spring seat is connected to the spring mounting portion. The seat mounting portion is arranged within a range defined between two straight lines which extend through a center of the lower spring seat and form an angle of ±45 degrees with respect to an axis of the lower link in a plan view.

13 Claims, 9 Drawing Sheets

OUTWARD IN
WIDTH DIRECTION

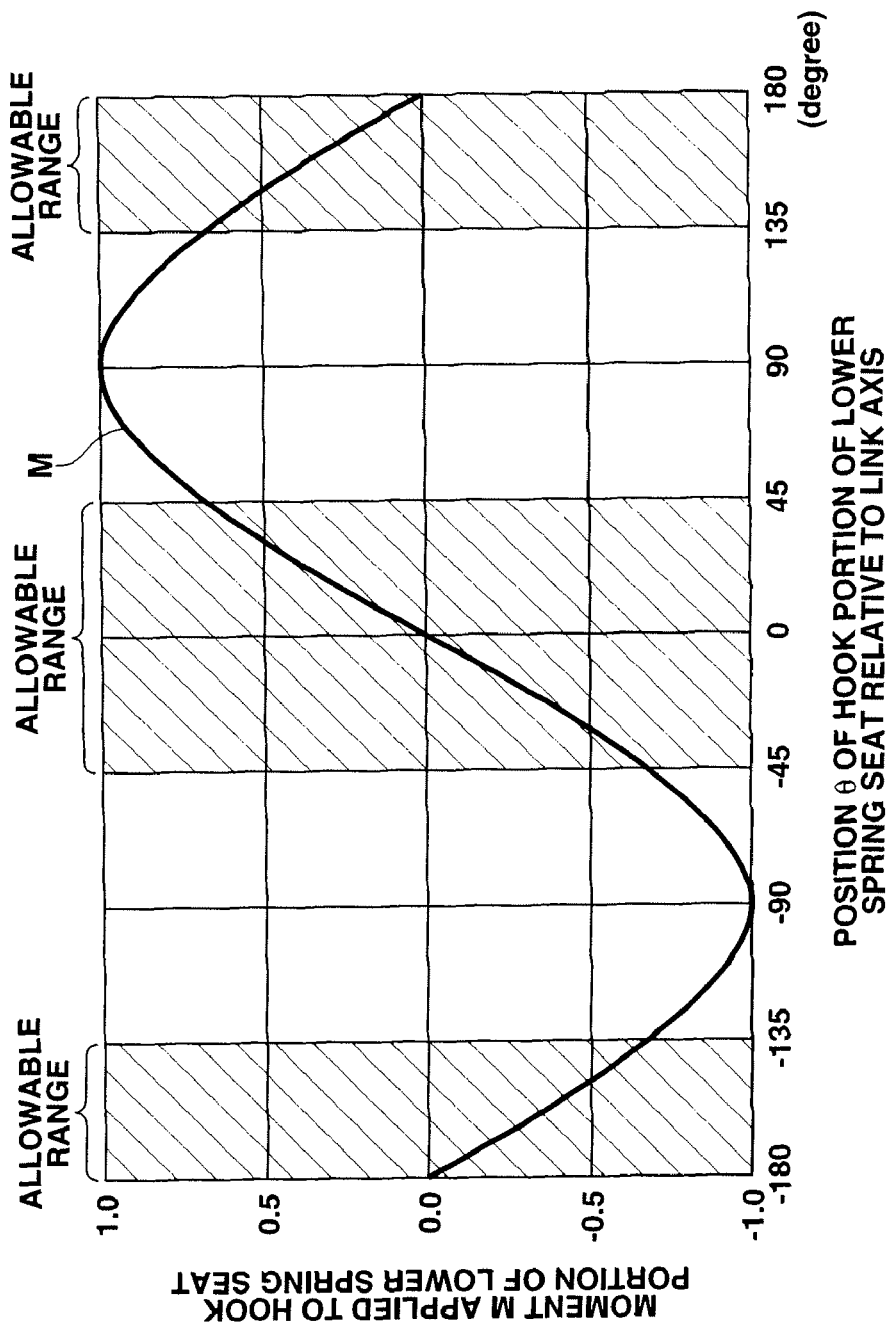

US 7,959,171 B2

LOWER SPRING SEAT MOUNTING STRUCTURE FOR VEHICLE SUSPENSION

BACKGROUND OF THE INVENTION

The present invention relates to a structure for mounting a coil spring in a vehicle suspension, more specifically, to a structure for mounting a lower spring seat to a spring mounting portion on a lower link through which a lower end portion of the coil spring is mounted to the spring mounting portion.

Japanese Utility Model Application Examined Publication No. H4-49396 shows a coil spring mounting structure in a vehicle suspension in which a coil spring is arranged such that an axis thereof extends in a vertical direction of the vehicle. An upper end portion of the coil spring is mounted to the vehicle body, and a lower end portion thereof is mounted to a suspension member. The upper end portion of the coil spring is mounted to an upper bracket on a side of the vehicle body through an upper spring seat (a spring insulator). The lower end portion of the coil spring is mounted to a lower bracket on a side of the suspension member through a lower spring seat made of an elastic material. The upper bracket is formed with a plurality of grooves that extend in a radial direction of the upper bracket. With the provision of the grooves, the upper spring seat is prevented from being offset from a position relative to the coil spring and the vehicle body along with the suspension stroke. That is, the upper spring seat is fixedly mounted to the upper bracket so as to be prevented from being offset relative to the upper bracket in a lateral or horizontal direction of the vehicle.

SUMMARY OF THE INVENTION

There has been conventionally proposed a vehicle suspension in which a coil spring and a shock absorber are mounted to separate positions in the vehicle suspension and a lower end portion of the coil spring is seated on a spring mounting portion that is disposed on a lower link. In this vehicle suspension, a lower spring seat might be interposed between the spring mounting portion and the lower end portion of the coil spring. In general, a relative displacement between the coil spring and the lower link which occurs along with the suspension stroke becomes larger than a relative displacement between the coil spring and a member on a side of the vehicle body. Therefore, the lower spring seat undergoes a large load that is inputted to in a fore-and-aft direction and a left-and-right direction of the vehicle (hereinafter referred to as a lateral direction of the vehicle) along with the suspension stroke.

If the lower spring seat is fixedly mounted at a plurality of mounting portions on the lower link so as to be prevented from being displaced, similar to the upper spring seat described in the above-described Japanese Utility Model Application Examined Publication No. H4-49396, the load inputted to the lower spring seat is concentrated on the mounting portions. That is, such mounting portions on the lower link suffer from a large tensile load that is inputted to the mounting portions upon every suspension stroke. For this reason, a mounting portion at which the lower spring seat is mounted to the lower link becomes deteriorated in strength and durability.

It is an object of the present invention to overcome the above problem and provide a structure for mounting a lower spring seat to a lower link in a vehicle suspension.

In one aspect of the present invention, there is provided a lower spring seat mounting structure in a suspension of a vehicle, the suspension including a lower link that connects an axle to a member on a side of a vehicle body, and a coil spring mounted to the lower link, the lower link having an axis which extends through a first mounting point at which the lower link is mounted to a side of the axle and a second mounting point at which the lower link is mounted to a side of the vehicle body, the lower spring seat mounting structure comprising:

a spring mounting portion to which a lower end portion of the coil spring is mounted, the spring mounting portion being disposed on the lower link, an elastic lower spring seat including one side surface that is in contact with the spring mounting portion and the other side surface that is in contact with the lower end portion of the coil spring; and a seat mounting portion at which the lower spring seat is connected to the spring mounting portion;

wherein the seat mounting portion is arranged within a range defined between two straight lines which extend through a center of the lower spring seat and form an angle of ±45 degrees with respect to the axis of the lower link in a plan view.

BRIEF DESCRIPTION OF THE DRAWINGS

FIG. 14 is a graph illustrating variation in magnitude of a moment that is applied to the hook portion of the lower spring seat when the hook portion is arranged offset with respect to the axis of the rear lower link in a predetermined angular range.

DETAILED DESCRIPTION OF THE INVENTION

Figure 1:
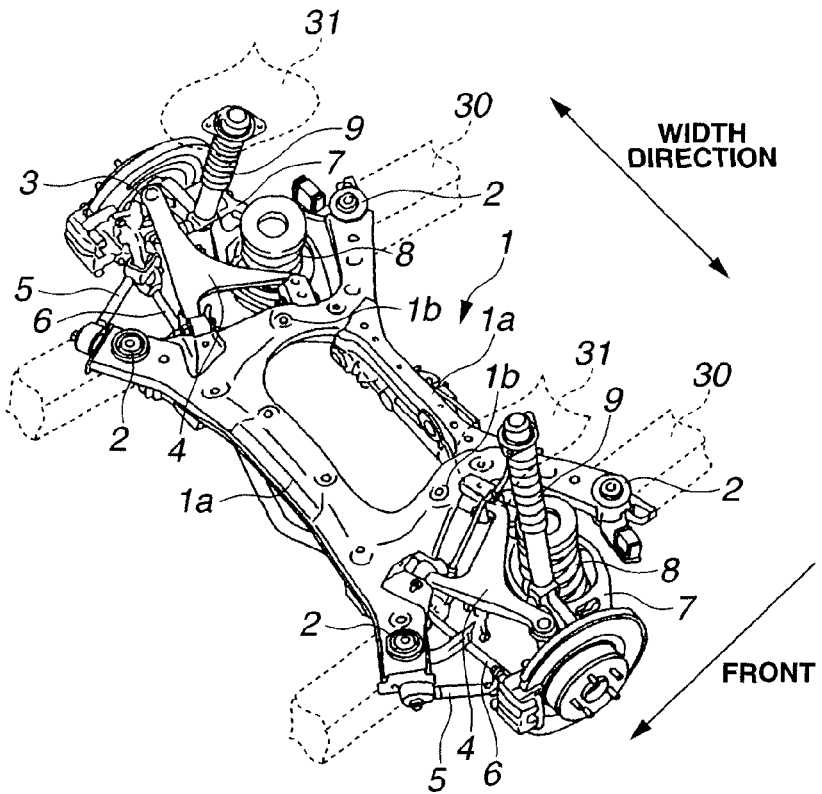
FIG. 1 is a perspective view of a suspension for a vehicle according to an embodiment of the present invention.

Referring to FIG. 1, there is shown a perspective view of a suspension for a vehicle, to which a structure for mounting a spring seat to a lower link, according to an embodiment of the present invention, is applicable. The suspension is disposed below a body frame 30 of the vehicle. As illustrated in FIG. 1, the suspension includes suspension member 1 that is elastically supported through a plurality of insulators 2 on the body frame 30. Suspension member 1 includes two cross members 1a that are arranged to be spaced from each other in a fore-and-aft direction of the vehicle, and left and right side-members 1b that are opposed to each other in a width direction of the vehicle. Cross members 1a and side-members 1b cooperate to form a generally "#" shape in a plan view.

A plurality of suspension links as indicated at 4 to 7 in FIG. 1, serve for connecting axle 3 to each of left and right side-members 1b. Axle 3 supports a wheel so as to be rotatable therearound. Specifically, the suspension links include upper link 4 that connects an upper portion of axle 3 with suspension member 1, and lower links 5 to 7 that connects a lower portion of axle 3 with suspension member 1.

In the suspension shown in FIG. 1, the lower links include radius rod 5, front lower link 6 and rear lower link 7. Coil spring 8 serving as a suspension link is connected to rear lower link 7 at a lower end portion thereof. An upper end portion of coil spring 8 is mounted to a part on a side of the vehicle body 31 through upper spring seat 42. A lower portion of shock absorber 9 is mounted to the upper portion of axle 3. An upper portion of shock absorber 9 is mounted to the body frame. Thus, coil spring 8 and shock absorber 9 are arranged separately from each other.

Figure 2:
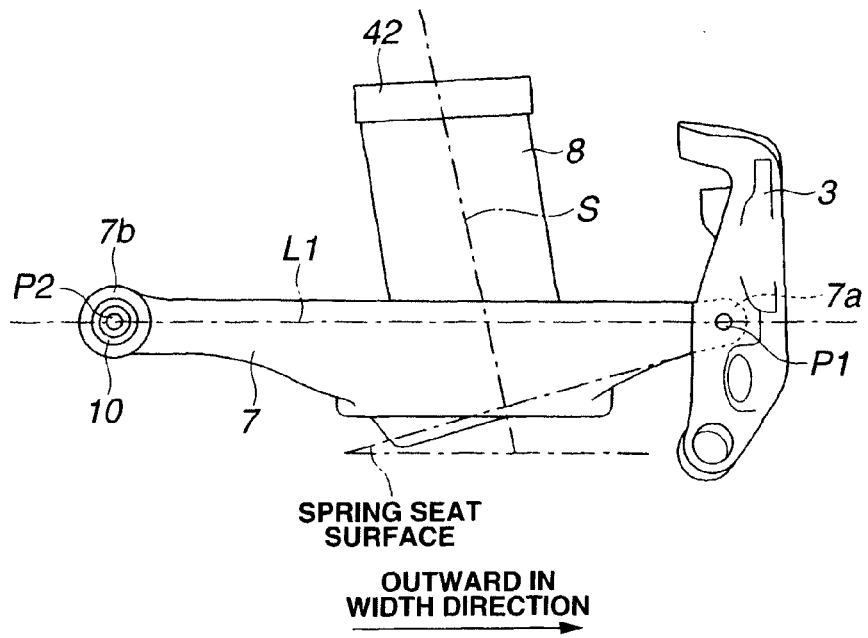
FIG. 2 is a schematic diagram illustrating a rear lower link and a coil spring in the suspension shown in FIG. 1 when viewed from a front side of the vehicle.
Figure 3:
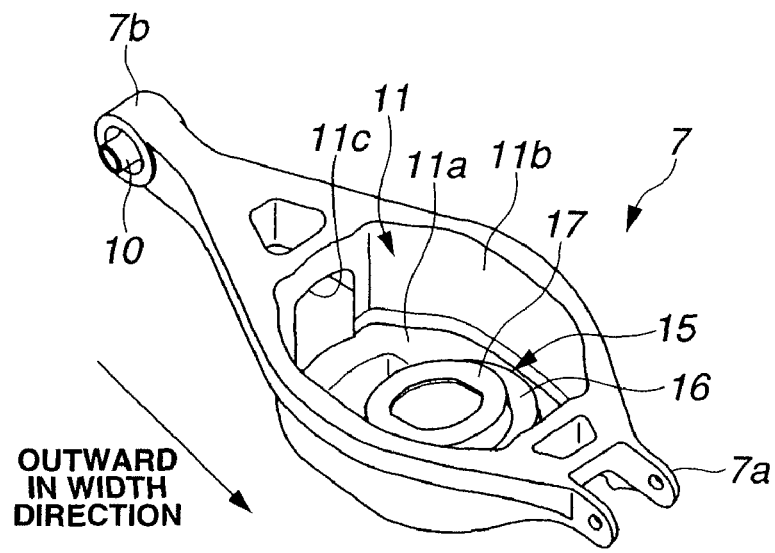
FIG. 3 is a perspective view of the rear lower link shown in FIG. 2, showing a lower spring seat mounted on the rear lower link.
Figure 4:
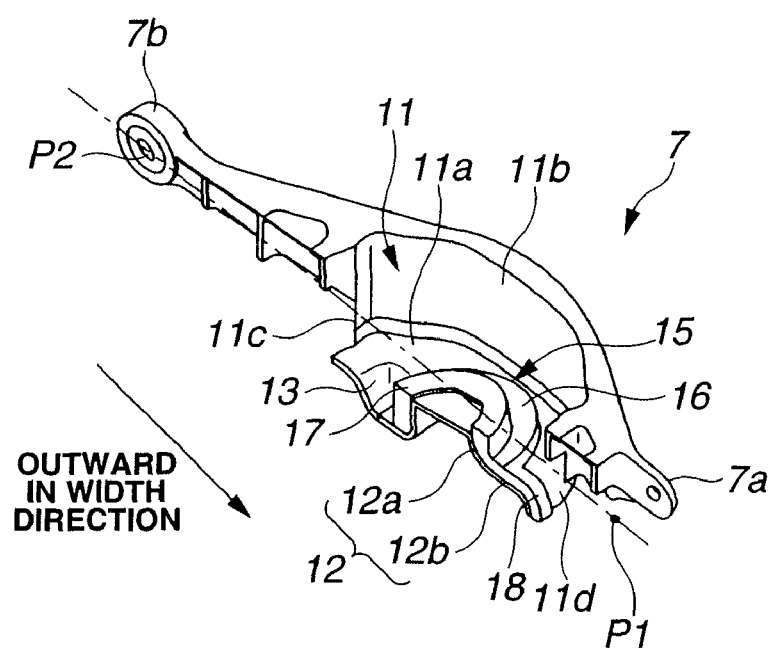
FIG. 4 is a perspective sectional view of the rear lower link and the lower spring seat, taken along a vertical plane in which an axis of the rear lower link lies.

As illustrated in FIG. 2 and FIG. 3, rear lower link 7 extends in the width direction of the vehicle. Rear lower link 7 includes end portion 7a on a side of axle 3 (hereinafter referred to as axle-side end portion 7a) which is connected to axle 3 so as to be upward and downward swingable through a bushing. Rear lower link 7 further includes end portion 7b on the side of the vehicle body (hereinafter referred to as vehicle body-side end portion 7b) which is connected to a member on the side of the vehicle body (hereinafter referred to as a vehicle body-side member) so as to be upward and downward swingable through bushing 10. Here, as shown in FIG. 2, a straight line that extends through axle-side mounting point P1 at which axle-side end portion 7a is mounted to axle 3, and vehicle body-side mounting point P2 at which vehicle body-side end portion 7b is mounted to the vehicle body-side member, functions as axis L1 of rear lower link 7. FIG. 4 shows a section of rear lower link 7, taken along a vertical plane in which axis L1 of rear lower link 7 lies.

Figure 5:
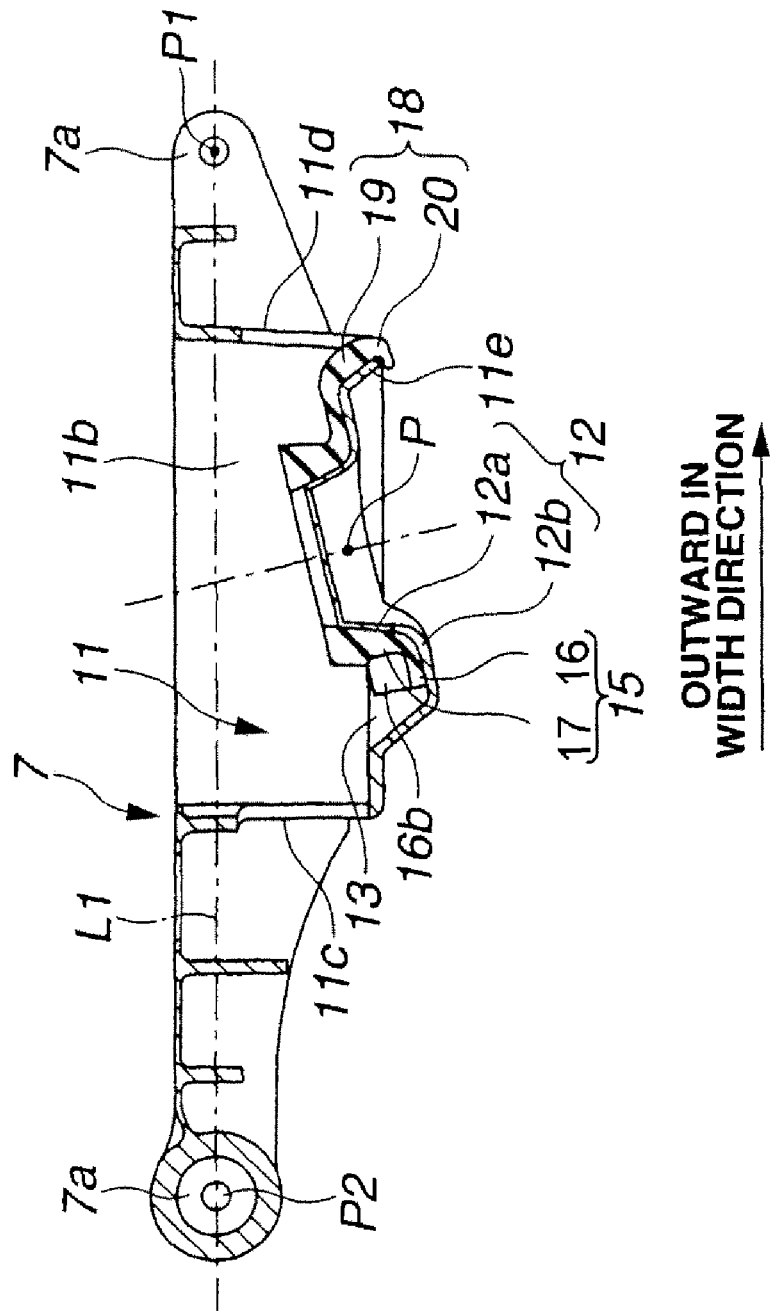
FIG. 5 is a sectional view of the rear lower link and the lower spring seat, taken along the vertical plane in which the axis of the rear lower link lies.

Rear lower link 7 further includes spring mounting portion 11 on a side of axle 3. As illustrated in FIG. 4 and FIG. 5, spring mounting portion 11 has a cap-shape having an upwardly opened recess. Cap-shaped spring mounting portion 11 includes mounting body 12 that is formed on an upper surface of bottom wall 11a of spring mounting portion 11. Mounting body 12 includes protruding portion 12a that upwardly projects and has a cylindrical-shaped contour, and annular seat portion 12b that is continuously connected with an outer circumferential periphery of protruding portion 12a.

Protruding portion 12a has an outer diameter that is smaller than an inner diameter of coil spring 8 and designed to allow protruding portion 12a to be inserted from the lower end portion of coil spring 8 into an inside of coil spring 8 in an axial direction of coil spring 8 with a play. An annular flat portion of mounting body 12 which is continuously connected with protruding portion 12a and disposed on an outer circumferential side of protruding portion 12a serves as seat portion 12b. Seat portion 12b is configured in position and size so as to be opposed to the lower end portion of coil spring 8 in a vertical direction of the vehicle, namely, in an up-and-down direction of the vehicle.

Protruding portion 12a and seat portion 12b are formed coaxially with each other. Further, a vertical axis of mounting body 12 is inclined in a same direction as that of axis S of coil spring 8 shown in FIG. 2. Namely, the vertical axis of mounting body 12 is inclined inwardly in the width direction of the vehicle. Specifically, mounting body 12 is inclined such that an axle-side portion thereof disposed on the side of axle 3 is positioned higher than a vehicle body-side portion thereof disposed on the side of the vehicle body in the vertical direction of the vehicle in a side view of the vehicle. That is, as shown in FIG. 5, in the side view of the vehicle, mounting body 12 is inclined such that the vertical axis of mounting body 12 as indicated by a dashed line in FIG. 5 approaches to the side of the vehicle body as the vertical axis of mounting body 12 ascends.

With the inclining construction of mounting body 12 in which the axle-side portion of mounting body 12 is positioned higher than the vehicle body-side portion of mounting body 12, a vehicle body-side portion of seat portion 12b is positioned lower than the upper surface of bottom wall 11a of spring mounting portion 11 of rear lower link 7. Specifically, the vehicle body-side portion of seat portion 12b is disposed within recessed portion 13 that is formed on bottom wall 11a of spring mounting portion 11.

Spring mounting portion 11 further includes open portions 11c and 11d which are formed in side wall 11b of spring mounting portion 11. Open portion 11c is formed in a portion of side wall 11b which is directed toward the side of the vehicle body. Open portion 11d is formed in a portion of side wall 11b which is directed toward the side of axle 3. These open portions 11c and open portions 11d act to remove water and pebbles therefrom which enter an inside space of spring mounting portion 11. Open portion 11d is hereinafter referred to as axle-side open portion 11d.

Bottom wall 11a includes inclined portion 11e that extends from an outer periphery of seat portion 12b of mounting body 12 toward the side of axle 3, namely, extends between seat portion 12b and a lower end of axle-side open portion 11d. Inclined portion 11e is downwardly inclined from the outer circumferential periphery of seat portion 12b toward axle-side open portion 11d and forms an outer surface downwardly inclined relative to seat portion 12b.

Figure 6:
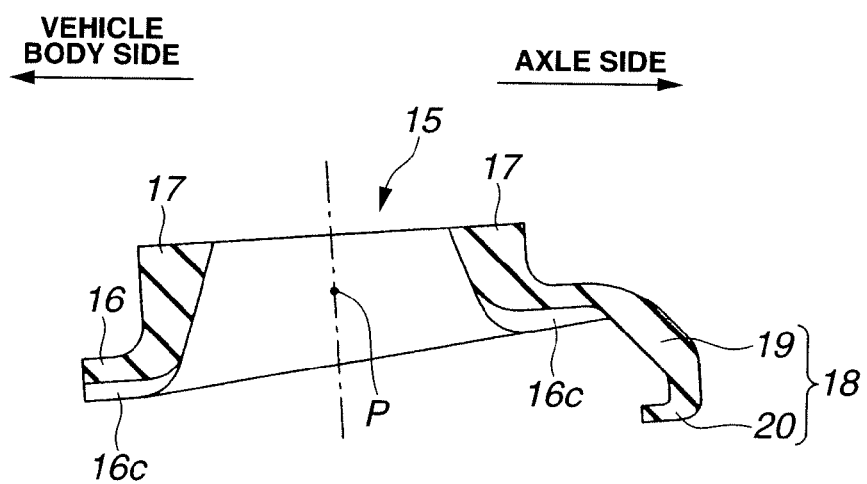
FIG. 6 is a sectional view of the lower spring seat, taken along a vertical plane in which a central axis of the lower spring seat lies.
Figure 7:
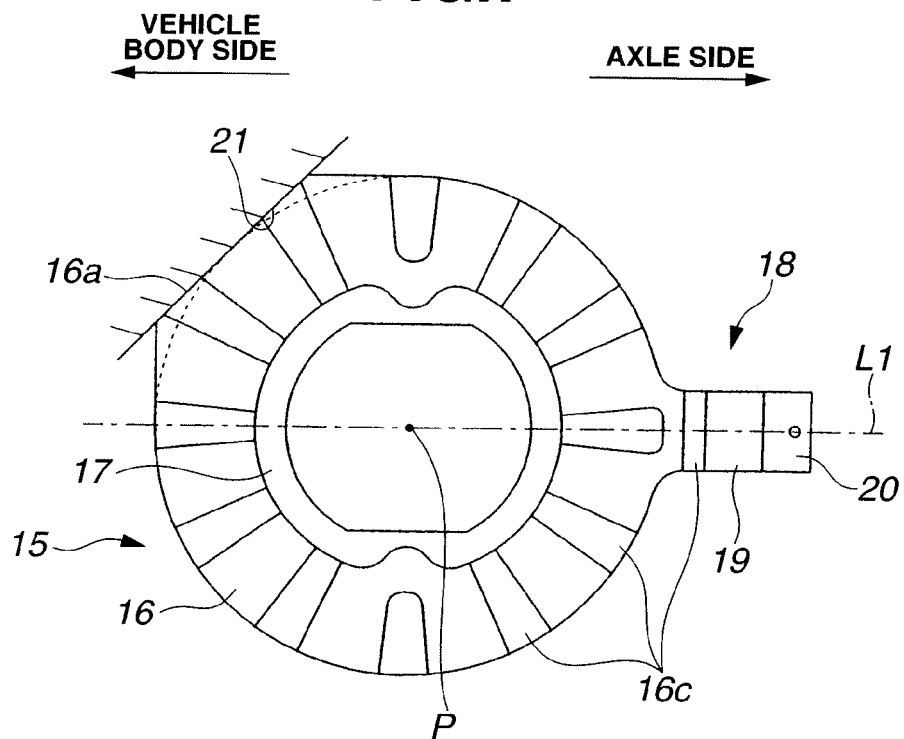
FIG. 7 is a plan view of the lower spring seat, showing an underside surface of the lower spring seat.

Lower spring seat 15 is arranged to be in contact with an outer surface of mounting body 12. Lower spring seat 15 is made of an elastic material such as rubber. As illustrated in FIG. 6, lower spring seat 15 has a lower surface and an inner surface which are configured corresponding to an upper surface of seat portion 12b and an upper surface of protruding portion 12a, respectively. Specifically, as shown in FIG. 5 to FIG. 7, lower spring seat 15 includes annular seat body 16 that is in contact with the upper surface of seat portion 12b at a lower surface thereof, and cylindrical portion 17 that is continuously connected with an inner circumferential portion of seat body 16 and extends upwardly and coaxially with seat body 16. Seat body 16 is so constructed as to permit the lower end portion of coil spring 8 to be seated on an upper surface of seat body 16 in contact therewith. Lower spring seat 15 further includes reinforcing ribs 16c that are formed on the lower surface of lower spring seat 15.

Lower spring seat 15 further includes hook portion 18 that is integrally formed with lower spring seat 15 and radially outwardly projects from annular seat body 16. Hook portion 18 extends toward the side of axle 3. Hook portion 18 includes extension 19 and hook body 20 which are integrally formed with lower spring seat 15. Extension 19 extends from an outer circumferential periphery of seat body 16 toward axle-side open portion 11d along inclined portion 11e of spring mounting portion 11 and penetrates through axle-side open portion 11d. Hook body 20 is continuously connected with an end portion of extension 19 which is directed toward the side of axle 3. Hook body 20 downwardly extends from the end portion of extension 19 and bends in a direction opposite to the direction of extension 19, namely, toward the side of the vehicle body, and further extends toward the side of the vehicle body so as to be disposed on an underside of inclined portion 11e. Thus, hook body 20 is formed into a hook shape. Hook body 20 is engaged with axle-side open portion 11d with a clearance therebetween in at least one of the width direction of the vehicle and the vertical direction of the vehicle.

As illustrated in FIG. 6, hook portion 18 is configured such that a thickness of extension 19 and a thickness of hook body 20 are different from each other. Hook body 20 has a thickness less than a thickness of extension 19. Further, it is preferred that hook portion 18 is arranged in alignment with axis L1 of rear lower link 7 in a plan view as shown in FIG. 7. In this arrangement, hook portion 18 is disposed on the side of axle 3 with respect to center P of lower spring seat 15. Further, as shown in FIG. 7, annular seat body 16 has a generally circular outer circumferential periphery in the plan view which includes a circular basic portion and a radially outward bulging portion that bulges from the circular basic portion in a radially outward direction of seat body 16. The radially outward bulging portion is hereinafter referred to as seat-side stop 16a. In this embodiment shown in FIG. 7, seat-side stop 16a has a straightly linearly extending contour in the plan view. Seat-side stop 16a comes into contact with lower link-side stop 21 and limits a pivotal motion of lower spring seat 15 about hook portion 18 that acts as a fulcrum, as explained later.

As shown in FIG. 7, seat-side stop 16a is disposed on the side of the vehicle body with respect to center P of lower spring seat 15. That is, hook portion 18 is disposed on the side of axle 3 with respect to center P of lower spring seat 15, and seat-side stop 16a is disposed on the opposite side, i.e., on the side of the vehicle body, with respect to center P of lower spring seat 15. Here, seat-side stop 16a is arranged out of alignment with axis L1 of rear lower link 7, namely, to be prevented from crossing axis L1 of rear lower link 7, in the plan view.

Spring mounting portion 11 further includes lower link-side stop 21 that is brought into contact with a side surface of seat-side stop 16a of lower spring seat 15. Lower link-side stop 21 is formed by a part of a side wall of recessed portion 13 formed on bottom wall 11a. When lower spring seat 15 is displaced to pivot about hook portion 18 as the fulcrum, seat-side stop 16a limits the pivotal motion of lower spring seat 15 by contacting with lower link-side stop 21.

A rigidity of lower link-side stop 21 provided upon mutual contact between lower link-side stop 21 and seat-side stop 16a is larger than a rigidity of extension 19 of hook portion 18 by increasing a contact surface area between lower link-side stop 21 and seat-side stop 16a. Seat body 16 further includes contact projection 16b that comes into contact with the lower end portion of coil spring 8 in the radial direction of coil spring 8.

Suspension member 1 constitutes the vehicle body-side member. Hook portion 18 and axle-side open portion 11d constitute the seat mounting portion at which lower spring seat 15 is connected to spring mounting portion 11 of rear lower link 7. Seat-side stop 16a constitutes the seat pivotal motion limiting portion that limits the pivotal motion of lower spring seat 15 about hook portion 18 as the fulcrum.

Figure 9:
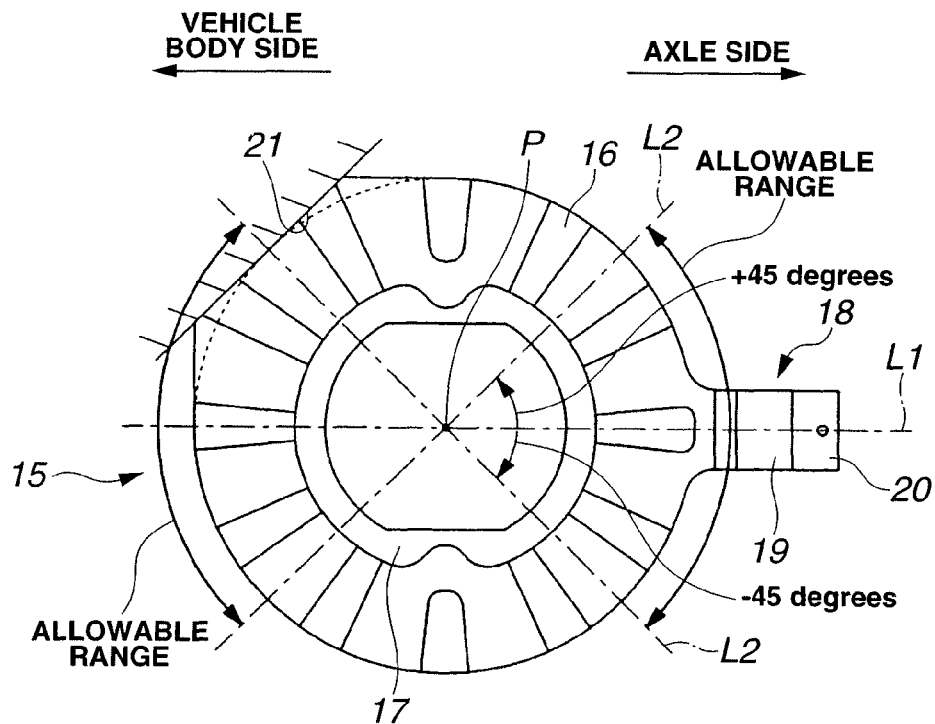
FIG. 9 is a plan view of the lower spring seat, showing an allowable range in which a hook portion of the lower spring seat can be arranged.

Further, it is possible to arrange hook portion 18 in an offset position that is offset about center P of lower spring seat 15 from the position in which hook portion 18 is arranged in alignment with axis L1 of rear lower link 7 in a plan view. The offset position is placed within a predetermined angular range about center P of lower spring seat 15 with respect to axis L1 of rear lower link 7. Specifically, as shown in FIG. 9, hook portion 18 can be arranged within the predetermined angular range that is defined by two straight lines L2, L2 which extend through center P of lower spring seat 15 and form an angle of ±45 degrees with respect to axis L1 of rear lower link 7 in a plan view.

(Operation)

Figure 8:
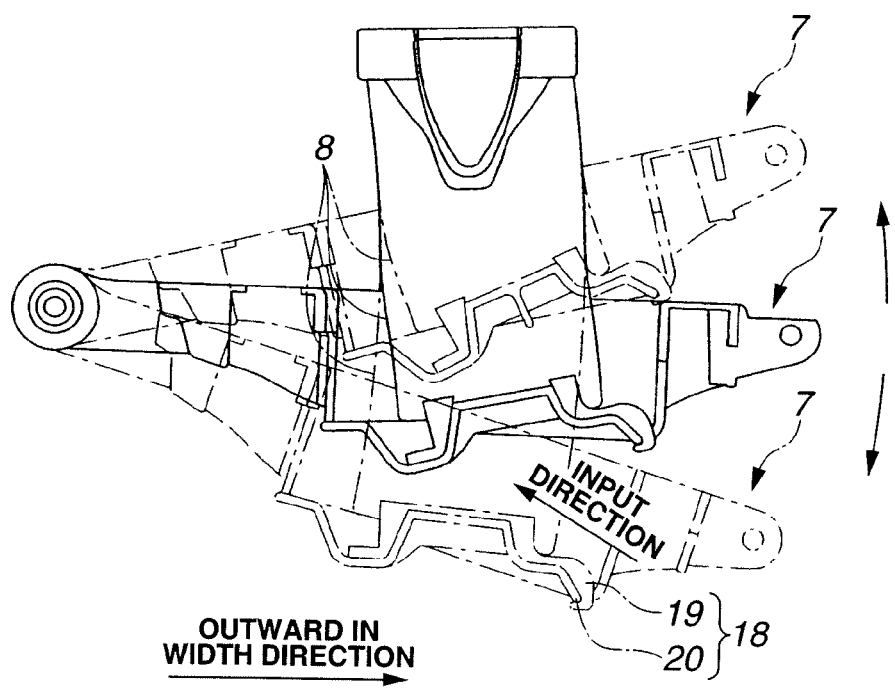
FIG. 8 is a side view of the rear lower link and the coil spring mounted to the rear lower link through the lower spring seat, illustrating a behavior of the lower link and the coil spring upon the suspension stroke.

As shown in FIG. 8, along with the suspension stroke, the seat mounting portion, i.e., hook portion 18, of lower spring seat 15 undergoes a load that is inputted to the seat mounting portion mainly in the width direction of the vehicle, specifically, in a direction that extends from the side of axle 3 toward the side of the vehicle body along axis L1 of rear lower link 7. Hook portion 18 carries the load, and allows a displacement of lower spring seat 15 in the lateral direction of the vehicle to some extent but prevents lower spring seat 15 from being disconnected from spring mounting portion 11. Further, lower spring seat 15 made of the elastic material is interposed between spring mounting portion 11 and the lower end portion of coil spring 8, so that occurrence of noise is suppressed.

Function and Effect of the Embodiment (1) With the arrangement in which lower spring seat 15 is mounted to rear lower link 7 through a single connecting portion between lower spring seat 15 and spring mounting portion 11 of rear lower link 7, i.e., through hook portion 18, a stress that occurs at the connecting portion can be reduced. As a result, strength and durability at the connecting portion of lower spring seat 15 to rear lower link 7 can be enhanced.

The reason is as follows. When a relative displacement between lower spring seat 15 and rear lower link 7 occurs at the connecting portion therebetween along with the suspension stroke, lower spring seat 15 is allowed to be displaced about single hook portion 18 as the fulcrum. Therefore, the stress that concentrates on hook portion 18 can be reduced. Specifically, since lower spring seat 15 is connected to rear lower link 7 only through single hook portion 18 that serves as the seat mounting portion as shown in FIG. 4, lower spring seat 15 can have a freedom for being displaced about hook portion 18 as the fulcrum to some extent. Accordingly, the stress concentration on the connecting portion between lower spring seat 15 and rear lower link 7 can be reduced to thereby enhance the strength and durability at the connecting portion of lower spring seat 15 to rear lower link 7.

(2) Further, hook portion 18 that serves as the seat mounting portion is arranged in alignment with axis L1 of rear lower link 7 in a plan view. Since the lateral displacement of lower spring seat 15 with respective to rear lower link 7 becomes large in the width direction of the vehicle, that is, in a direction along axis L1 of rear lower link 7, hook portion 18 is arranged in alignment with axis L1 of rear lower link 7 in a plan view. With this arrangement, lower spring seat 15 can be prevented from being disconnected from spring mounting portion 11 even when lower spring seat 15 is allowed to be displaced about hook portion 18 as the fulcrum. Thus, it is possible to avoid disconnection of lower spring seat 15 from spring mounting portion 11 and reduce the stress that is caused at the connecting portion between lower spring seat 15 and rear lower link 7 along with the suspension stroke.

(3) With the arrangement in which hook portion 18 is disposed on the side of axle 3 with respect to center P of lower spring seat 15, lower spring seat 15 can be more certainly prevented from being disconnected from rear lower link 7 due to the stress that is caused upon a relative displacement between coil spring 8 and rear lower link 7 along with the suspension stroke. Specifically, as shown in FIG. 8, the relative displacement between lower spring seat 15 and coil spring 8 which occurs during the suspension stroke becomes large on the side of axle 3 with respect to center P of lower spring seat 15. Lower spring seat 15 and rear lower link 7 are connected to each other through hook portion 18 that is disposed on the side of axle 3 with respect to center P of lower spring seat 15. With this arrangement, the relative displacement (offset) between lower spring seat 15 and rear lower link 7 which occurs during the suspension stroke can be more effectively suppressed. As a result, lower spring seat 15 can be held in the surely mounted state relative to rear lower link 7.

(4) Further, with the arrangement in which lower spring seat 15 is connected to rear lower link 7 by engaging hook portion 18 with axle-side open portion 11d, a displacement of lower spring seat 15 relative to rear lower link 7 which is caused by the load inputted from the side of axle 3 toward the side of the vehicle body can be more effectively suppressed. As a result, a displacement of lower spring seat 15 relative to rear lower link 7 which occurs along with the suspension stroke can be more certainly avoided. Specifically, the load that is inputted to lower spring seat 15 upon occurrence of the relative displacement between rear lower link 7 and coil spring 8 along with the suspension stroke becomes largest in the direction from the side of axle 3 toward the side of the vehicle body. Hook portion 18 is formed with hook body 20 that downwardly extends from the end portion of extension 19 and bends toward the side of the vehicle body. With the provision of hook body 20, hook portion 18 is engaged with axle-side open portion 11d in such a manner as to wind on axle-side open portion 11d. That is, hook portion 18 is so constructed as to withstand the load inputted from the side of axle 3 toward the side of the vehicle body in both the left-and-right direction of the vehicle and the vertical direction of the vehicle. As a result, lower spring seat 15 can be held in the surely engaged state relative to rear lower link 7 against the inputted load.

(5) With the provision of seat-side stop 16a that acts as a seat pivotal motion limiting portion, seat-side stop 16a can limit a pivotal motion of lower spring seat 15 about hook portion 18 even when lower spring seat 15 connected to rear lower link 7 through hook portion 18 is allowed to be displaced relative to rear lower link 7 in the lateral direction of the vehicle to some extent. That is, positioning of lower spring seat 15 with respect to spring mounting portion 11 of rear lower link 7 can be performed by the seat pivotal motion limiting portion. Further, the displacement of lower spring seat 15 in the direction of axis L1 of rear lower link 7 can be limited mainly by hook portion 18. Further, even when lower spring seat 15 is allowed to be pivotally displaced about hook portion 18 as the fulcrum, an amount of the pivotal displacement can be limited by contact of seat-side stop 16a with lower link-side stop 21. Accordingly, strength and durability of hook portion 18 can be enhanced by the limited amount of the displacement of lower spring seat 15.

In particular, since seat-side stop 16a has the rigidity larger than the rigidity of extension 19 of hook portion 18, the positioning of lower spring seat 15 with respect to rear lower link 7 in both the left-and-right direction of the vehicle and the vertical direction of the vehicle can be more surely performed. Further, since hook portion 18 has the rigidity smaller than the rigidity of seat-side stop 16a, hook portion 18 can carry the load that is inputted to lower spring seat 15 upon occurrence of the relative displacement between lower spring seat 15 and rear lower link 7 during the suspension stroke, and hook portion 18 can be freely displaced in response to the inputted load. As a result, hook portion 18 can be enhanced in strength and durability.

(6) With the arrangement in which seat-side stop 16a is disposed on the side of the vehicle body with respect to center P of lower spring seat 15, lower spring seat 15 can be substantially prevented from being displaced from rear lower link 7 due to the load that is inputted to lower spring seat 15 along with the suspension stroke. Specifically, the relative pivotal displacement between lower spring seat 15 and rear lower link 7 is limited in a position in which the relative displacement between lower spring seat 15 and coil spring 8 due to the suspension stroke is small, namely, on the side of the vehicle body with respect to center P of lower spring seat 15. Therefore, the load that is inputted to lower spring seat 15 in such a direction that lower spring seat 15 is displaceable with respect to rear lower link 7, becomes small. As shown in FIG. 8, the relative displacement between lower spring seat 15 and coil spring 8 which occurs during the suspension stroke becomes smaller on the side of the vehicle body than on the side of axle 3. That is, the load that is inputted to lower spring seat 15 becomes smaller on the side of the vehicle body than on the side of axle 3. Since seat-side stop 16a having the large rigidity is disposed on the side of the vehicle body and carries the smaller load inputted to lower spring seat 15, the relative displacement between lower spring seat 15 and rear lower link 7 can be more certainly suppressed.

(7) With the arrangement in which hook portion 18 is engaged with axle-side open portion 11d with a clearance therebetween in at least one of the width direction of the vehicle and the vertical direction of the vehicle, the bearing rigidity of hook portion 18 with respect to rear lower link 7 can be decreased. That is, since the clearance is formed between hook portion 18 and axle-side open portion 11d, hook body 20 serving as a rigidity varying portion can be free from stress that is caused due to contact between hook body 20 and axle-side open portion 11d. Therefore, it is possible to reduce stress concentration on hook portion 18. As a result, a local rigidity of hook portion 18 can be reduced to thereby enhance the durability of hook portion 18.

(8) With the construction of hook portion 18 in which the thickness of hook body 20 is less than the thickness of extension 19, the rigidity of hook body 20 becomes smaller than the rigidity of extension 19 to thereby optimize a rigidity balance therebetween. Hook body 20 through which hook portion 18 is connected with axle-side open portion 11d, transmits force between hook portion 18 and axle-side open portion 11d. As a result, the bearing rigidity of hook portion 18 with respect to rear lower link 7 can be reduced to thereby further enhance the durability of hook portion 18.

(9) Hook portion 18 is arranged within the range that is defined by straight lines L2, L2 which extend through center P of lower spring seat 15 and form an angle of ±45 degrees with respect to axis L1 of rear lower link 7 in a plan view. With this arrangement, it is possible to suitably suppress an increase in moment that is applied to hook portion 18. As a result, strength and durability at hook portion 18 as the connecting portion at which lower spring seat 15 is connected to spring mounting portion 11 of rear lower link 7 can be enhanced.

Figure 10:
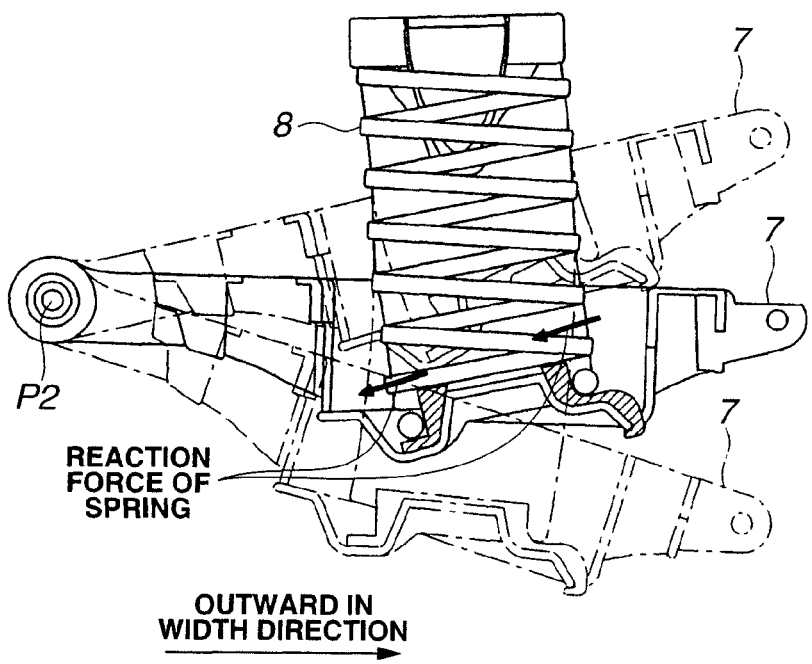
FIG. 10 is a side view of the rear lower link and the coil spring mounted to the rear lower link through the lower spring seat, illustrating a behavior of the rear lower link and reaction forces of the coil spring upon the suspension stroke.
Figure 11:
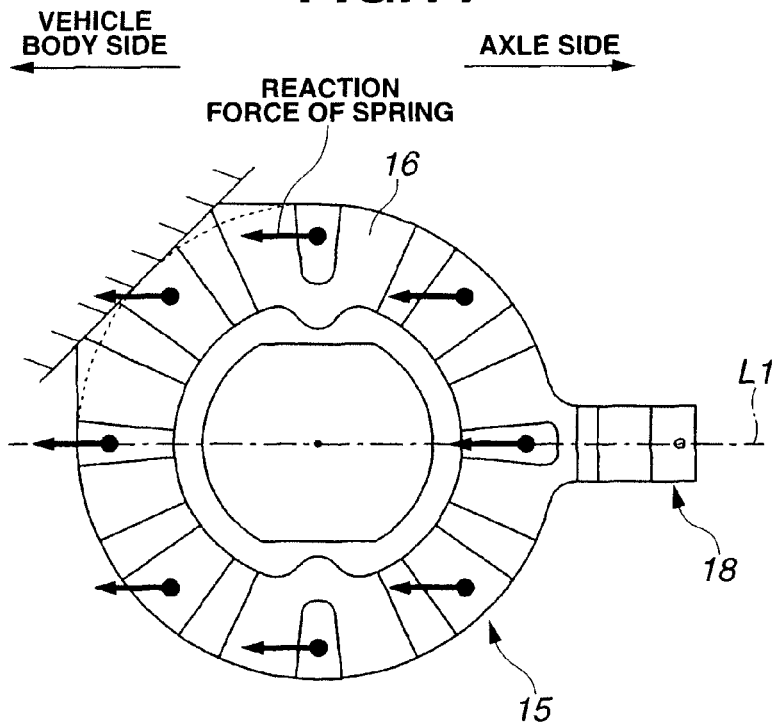
FIG. 11 is an explanatory diagram illustrating the reaction forces of the coil spring which act on the lower spring seat.

The reason is as follows. As shown in FIG. 10, rear lower link 7 is pivotally moved about vehicle body-side mounting point P2 in the vertical direction of the vehicle upon a vertical stroke of the wheel. A relative displacement between rear lower link 7 and coil spring 8 in the width direction of the vehicle occurs along with the pivotal motion of rear lower link 7. At this time, due to the relative displacement between rear lower link 7 and coil spring 8 in the width direction of the vehicle, reaction forces of coil spring 8 in the width direction of the vehicle from a side of the axle toward the side of the vehicle body are applied to lower spring seat 15 that is in contact with coil spring 8, as indicated by arrows in FIG. 10. As shown in FIG. 11, the reaction forces of coil spring 8 as a distributed load act on the contact surface, i.e., seat body 16, of lower spring seat 15 which is in contact with coil spring 8.

Figure 12:
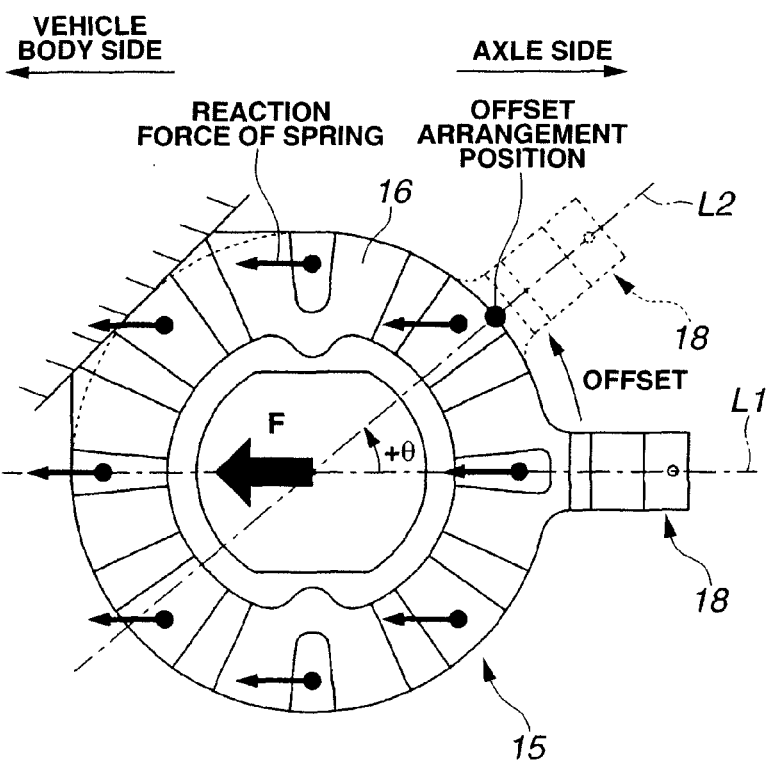
FIG. 12 is an explanatory diagram illustrating a resultant force of the reaction forces of the coil spring which act on the lower spring seat, and an arrangement of the hook portion of the lower spring seat in which the hook portion is placed in a position offset relative to the axis of the rear lower link.
Figure 13:
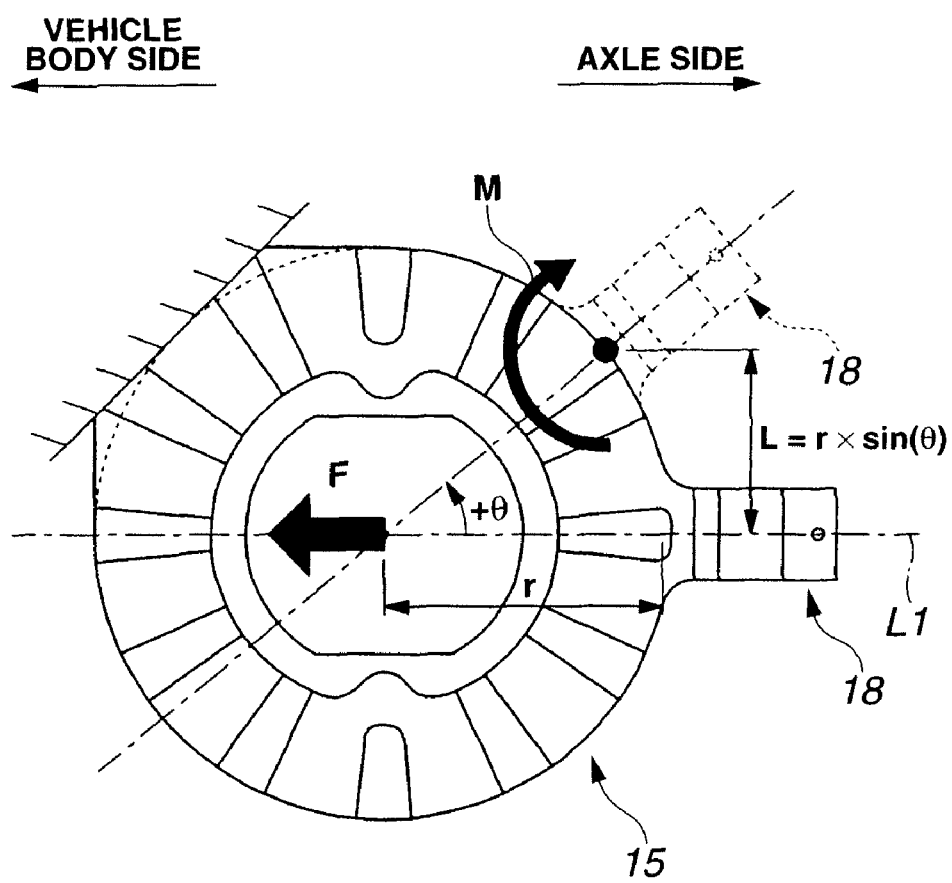
FIG. 13 is an explanatory diagram illustrating a magnitude of a moment that is applied to the hook portion of the lower spring seat when the hook portion is arranged in an angular position offset relative to the axis of the rear lower link.

As shown in FIG. 12, the distributed load is converted into a concentrated load, i.e., resultant force F of the reaction forces of coil spring 8, at center P of lower spring seat 15 which is in alignment with the center of coil spring 8. When hook portion 18 is arranged in an offset position that is offset by angle +θ in a counterclockwise direction as shown in FIG. 12 from the position in which hook portion 18 is arranged in alignment with axis L1 of rear lower link 7 as shown in FIG. 11, moment M is applied to hook portion 18 due to resultant force F as shown in FIG. 13. Specifically, a magnitude of moment M that is applied to hook portion 18 is expressed and given by the following formula: M=F×L=F×r×sin θ wherein F denotes a resultant force, L denotes a distance from a point of application of resultant force F as shown in FIG. 13, and r denotes a radius of lower spring seat 15 which extends from the point of application of resultant force F to a radial inner end of hook portion 18 at which hook portion 18 is connected to seat body 16 as shown in FIG. 13.

The magnitude of moment M varies in proportion to a magnitude of resultant force F and distance L from the point of application of resultant force F, namely, in proportion to (F×L). Therefore, in order to reduce the magnitude of moment M that is applied to hook portion 18, either or both of the magnitude of resultant force F and the distance L must be reduced. Here, since variation in magnitude of resultant force F and radius r may cause modification in design of the whole suspension apparatus, the magnitude of resultant force F and the radius r should remain unchanged or can be limited to a certain extent. Therefore, in order to reduce moment M to a certain magnitude or less, an increase in distance L is to be suppressed by controlling a value of sin θ, i.e., angle θ that is formed by two straight lines L2, L2 therebetween which represents an angular position of hook portion 18 with respect to axis L1 of rear lower link 7, within a predetermined range.

FIG. 14 shows a relationship between the magnitude of moment M that is applied to hook portion 18, and the angular position θ of hook portion 18 with respect to axis L1 of rear lower link 7. As shown in FIG. 14, when angle θ of hook portion 18 with respect to axis L1 of rear lower link 7 is +90 degrees and −90 degrees, the magnitude of moment M becomes the maximum, i.e., 1.0. When angle θ of hook portion 18 with respect to axis L1 of rear lower link 7 is 0 degrees, +180 degrees and −180 degrees, the magnitude of moment M becomes the minimum, i.e., 0.

Accordingly, when hook portion 18 is arranged in the range defined by two straight lines L2, L2 which extend through center P of lower spring seat 15 and form the angle of ±45 degrees with respect to axis L1 of rear lower link 7, an increase in the magnitude of moment M that is applied to hook portion 18 can be suppressed. As a result, the seat mounting portion at which lower spring seat 15 is mounted to rear lower link 7 can be enhanced in strength and durability as explained above. Further, hook portion 18 of lower spring seat 15 can be arranged not only in the alignment position in which hook portion 18 is aligned with axis L1 of rear lower link 7, but also in the offset position offset from the alignment position to a certain extent. With this arrangement, a freedom of shape of rear lower link 7 and design of axle-side open portion 11d can be enhanced.

Modification of the Embodiment (1) In the above-described embodiment, hook portion 18 that constitutes the seat mounting portion is engaged with axle-side open portion 11d for drainage. Alternately, an open portion may be provided in bottom wall 11a of spring mounting portion 11 and may be engaged with hook portion 18.
(2) The seat mounting portion may be disposed on the side of the vehicle body with respect to center P of lower spring seat 15.
(3) A plurality of seat-side stops 16a may be provided. For instance, seat-side stops 16a are symmetrically formed with respect to axis L1 of rear lower link 7 in a plan view.

This application is based on prior Japanese Patent Application No. 2007-304683 filed on Nov. 26, 2007 and Japanese Patent Application No. 2008-193454 filed on Jul. 28, 2008. The entire contents of the Japanese Patent Applications No. 2007-304683 and No. 2008-193454 are hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A lower spring seat mounting structure in a suspension of a vehicle, the suspension including a lower link that connects an axle to a member on a side of a vehicle body, and a coil spring mounted to the lower link, the lower link having an axis which extends through a first mounting point at which the lower link is mounted to a side of the axle and a second mounting point at which the lower link is mounted to a side of the vehicle body, the lower spring seat mounting structure comprising:
 a spring mounting portion to which a lower end portion of the coil spring is mounted, the spring mounting portion being disposed on the lower link,
 a lower spring seat including one side surface that is in contact with the spring mounting portion and the other side surface that is in contact with the lower end portion of the coil spring; and
 a seat mounting portion at which the lower spring seat is connected to the spring mounting portion;
 wherein the seat mounting portion is arranged within a range defined between two straight lines which extend through a center of the lower spring seat and form an angle of ±45 degrees with respect to the axis of the lower link in a plan view, wherein the lower spring seat has an outer periphery shaped to accommodate the coil spring and the seat mounting portion projects radially outward from the outer periphery in a plan view, wherein the seat mounting portion comprises an open portion that is formed in the lower link, and a hook portion that is integrally formed with the lower spring seat and engaged with the open portion, and wherein the open portion is disposed on the side of the axle with respect to the lower spring seat, and the hook portion comprises an extension that extends, in a plan view, in a direction toward the open portion to penetrate through the open portion, and a hook body at a distal end of the extension that extends, in a plan view, in a direction opposite to the direction of the extension and is engaged with the open portion at the distal end of the extension.

2. The lower spring seat mounting structure as claimed in claim 1, wherein the seat mounting portion is arranged in alignment with the axis of the lower link in a plan view.

3. The lower spring seat mounting structure as claimed in claim 1, wherein the hook body and the open portion are engaged with each other with a clearance in at least one of a vertical direction of the vehicle and a width direction of the vehicle.

4. The lower spring seat mounting structure as claimed in claim 1, wherein the hook body has a thickness smaller than a thickness of the extension.

5. The lower spring seat mounting structure as claimed in claim 1, further comprising a seat pivotal motion limiting portion that comes into contact with the spring mounting portion and limits a pivotal motion of the lower spring seat, the seat pivotal motion limiting portion having a rigidity which is larger than a rigidity of the seat mounting portion upon limiting the pivotal motion of the lower spring seat.

6. The lower spring seat mounting structure as claimed in claim 5, wherein the seat pivotal motion limiting portion is disposed on the side of the vehicle body with respect to the center of the lower spring seat.

7. The lower spring seat mounting structure as claimed in claim 1, wherein the lower spring seat is formed of elastic material.

8. The lower spring seat mounting structure as claimed in claim 1, wherein the outer periphery is generally circular in shape in a plan view.

9. The lower spring seat mounting structure as claimed in claim 1, wherein the seat mounting portion comprises, at an end of the seat mounting portion, a portion shaped to grip the lower link.

10. A lower spring seat mounting structure in a suspension of a vehicle, the suspension including a lower link that connects an axle to a member on a side of a vehicle body, and a coil spring mounted to the lower link, the lower link having an axis which extends through a first mounting point at which the lower link is mounted to a side of the axle and a second mounting point at which the lower link is mounted to a side of the vehicle body, the lower spring seat mounting structure comprising:

a spring mounting portion to which a lower end portion of the coil spring is mounted, the spring mounting portion being disposed on the lower link, a lower spring seat including one side surface that is in contact with the spring mounting portion and the other side surface that is in contact with the lower end portion of the coil spring; and means for connecting the lower spring seat to the spring mounting portion such that a connecting portion of the lower spring seat to the spring mounting portion is placed in a position within a range defined between two straight lines which extend through a center of the lower spring seat and form an angle of ±45 degrees with respect to the axis of the lower link in a plan view, wherein the lower spring seat has an outer periphery shaped to accommodate the coil spring and the means for connecting projects radially outward from the outer periphery in a plan view, wherein the means for connecting comprises an open portion that is formed in the lower link, and a hook portion that is integrally formed with the lower spring seat and engaged with the open portion, and wherein the open portion is disposed on the side of the axle with respect to the lower spring seat, and the hook portion comprises an extension that extends, in a plan view, in a direction toward the open portion to penetrate through the open portion, and a hook body at a distal end of the extension that extends, in a plan view, in a direction opposite to the direction of the extension and is engaged with the open portion at the distal end of the extension.

11. The lower spring seat mounting structure as claimed in claim 10, wherein the lower spring seat is formed of elastic material.

12. The lower spring seat mounting structure as claimed in claim 10, wherein the outer periphery is generally circular in shape in a plan view.

13. The lower spring seat mounting structure as claimed in claim 10, wherein the means for connecting comprises, at an end of the means for connecting, a portion shaped to grip the lower link.

* * * * *